(12) United States Patent
Petri et al.

(10) Patent No.: US 10,539,955 B2
(45) Date of Patent: Jan. 21, 2020

(54) FAILURE ANALYSIS VALIDATION AND VISUALIZATION

(75) Inventors: Tyler Junichi Petri, Seattle, WA (US); Daniel J. Fogarty, Mukilteo, WA (US); David Harding Jones, Bellevue, WA (US); Allison Moran, Batavia, IL (US); Kevin Nicholas King, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 543 days.

(21) Appl. No.: 13/524,173

(22) Filed: Jun. 15, 2012

(65) Prior Publication Data

US 2013/0339795 A1    Dec. 19, 2013

(51) Int. Cl.
*G05B 23/02*    (2006.01)

(52) U.S. Cl.
CPC ................................ *G05B 23/0262* (2013.01)

(58) Field of Classification Search
CPC ................................................... G05B 23/0262
See application file for complete search history.

(56) References Cited

U.S. PATENT DOCUMENTS

| | | | |
|---|---|---|---|
| 5,161,158 A * | 11/1992 | Chakravarty | G06F 11/261 714/26 |
| 6,208,955 B1 * | 3/2001 | Provan | G06F 11/2257 703/20 |
| 6,865,458 B1 * | 3/2005 | Kim | 701/36 |
| 7,403,901 B1 * | 7/2008 | Carley | G06Q 50/22 705/2 |

(Continued)

FOREIGN PATENT DOCUMENTS

| | | |
|---|---|---|
| CN | 101365212 A | 2/2009 |
| GB | 2 275 559 A | 8/1994 |
| JP | 2006252422 A | 9/2006 |
| JP | 2007323638 A | 12/2007 |

OTHER PUBLICATIONS

Definition of Consistency, http://www.thefreedictionary.com/consistency, last viewed May 27, 2015.*

(Continued)

*Primary Examiner* — Manuel L Barbee
*Assistant Examiner* — Raymond L Nimox
(74) *Attorney, Agent, or Firm* — Womble Bond Dickinson (US) LLP

(57) ABSTRACT

A system is provided for integrating failure data for different failure analysis layouts. The system includes a data validator and layout engine. The data validator is configured to validate failure analysis data for a complex system including a plurality of systems. The failure analysis data includes failure data identifying failed systems, and design data describing the complex system and possible failures of at least some of its systems. In this regard, the data validator is configured to perform one or more consistency checks between the failure data and design data to thereby integrate the failure data for a plurality of different failure analysis layouts. The layout engine is in turn configured to selectively generate and communicate any one or more of the plurality of different layouts of the failure analysis data, with at least some of the failure analysis data being shared between at least some of the different layouts.

22 Claims, 11 Drawing Sheets

(56) References Cited

U.S. PATENT DOCUMENTS

| | | | |
|---|---|---|---|
| 7,681,086 B2* | 3/2010 | Vlassova | G06F 17/5009 |
| | | | 700/177 |
| 7,770,052 B2* | 8/2010 | King et al. | 714/2 |
| 2006/0025908 A1* | 2/2006 | Rachlin | G05B 23/0251 |
| | | | 701/31.4 |
| 2006/0126608 A1* | 6/2006 | Pereira | G05B 13/042 |
| | | | 370/360 |
| 2008/0297375 A1* | 12/2008 | Khuzadi | 340/945 |
| 2008/0312783 A1* | 12/2008 | Mansouri | G07C 5/0808 |
| | | | 701/31.4 |
| 2009/0076776 A1 | 3/2009 | Bordry et al. | |
| 2011/0126111 A1* | 5/2011 | Gill | G06F 21/55 |
| | | | 715/736 |
| 2012/0101793 A1* | 4/2012 | Cheriere | G05B 23/0248 |
| | | | 703/8 |
| 2012/0216243 A1* | 8/2012 | Gill | G06F 21/55 |
| | | | 726/1 |
| 2012/0224057 A1* | 9/2012 | Gill | G06F 21/55 |
| | | | 348/143 |

OTHER PUBLICATIONS

European Search Report dated Nov. 6, 2013 for European Application No. 13 166 291.8, 4 pages.

Considering Cumulative Effects Under the National Environmental Policy Act, Council on Environmental Quality Executive Office of the President, Jan. 1997.

Merkling, Seeking Failure-Free Systems, Air University Review, Jul.-Aug. 1976, 6 pages.

Mohr, Failure Modes and Effects Analysis, Feb. 2002, 8th Edition, Jacobs Sverdrup, 37 pages.

Notice of Reasons for Rejection dated Aug. 8, 2017 for Patent Application No. 2013-121618.

First Chinese Office Action dated Feb. 28, 2017 for Application No. 201310238161.X.

Examination Report dated Mar. 25, 2019; Indian Application No. 1631/CHEN/2013.

Notice of Korean Office Action dated Apr. 9, 2019 for Patent Application No. 10-2013-0042264.

* cited by examiner

| Failure Case | Failure Case Probability | Failure Case Hazard | Test Procedures | Crew Alert Messages | Flight Deck Effects | Etc. |
|---|---|---|---|---|---|---|
| Test Identification Number | Failure case probability | Failure case hazard | Test procedures text | List of expected crew alert messages | List of expected flight deck effects | Text |
| Test description (Failure case description) | | | | | | |

FIG. 13

FAILURE ANALYSIS VALIDATION AND VISUALIZATION

TECHNOLOGICAL FIELD

The present disclosure relates generally to layouts of failure analysis data and, in particular, to distinct layouts of failure analysis data for different stakeholders in a manner facilitating consistency of the data between the layouts.

BACKGROUND

Advances in the design of many complex systems such as those in the aerospace, automotive, marine and electronics industries have led to the development of numerous mutually dependent systems. Failures or malfunctions of one or more of these systems often affect other systems, directly or indirectly. Additionally, analysis of these failures/malfunctions and their direct and indirect effects is often required as part of a certification process. Typically such analyses are manually performed by groups of system analysts, without reference to a system or process capable of facilitating such analyses.

Data from failure analyses may be represented as graphical representations that convey information more clearly than text. Records (e.g., graphical representations, test plans) developed from this data may be used to evaluate the acceptability of failure analyses with federated systems as well as with integrated systems. Currently, these records may be created by different engineering organizations, each with their own perspective and interests, through time-consuming, manual methods, which may be prone to error and lack consistency and sufficient integration and controls.

In aircraft programs with federated systems, failure analyses can be straightforward, and usually involve a limited number of systems with easily-understood cascading aircraft-level effects. The records used to evaluate the acceptability of failure analyses with federated systems are usually limited to what an individual system expert deems sufficient, and failure evaluation can be made by a limited number of people.

When performed on complex aircraft systems with highly-integrated architectures, on the other hand, failure analyses can involve many systems with complex cascading effects and aircraft-level impacts that are not easily understood without a complete picture of the event. In order to make a valid assessment of a failure analysis in this environment, there are many more stakeholders who must be involved than would be required to evaluate a failure in a federated system environment. Each of these stakeholders has a particular layout of the failure event that they may be particularly interested in (all of which are valid). All layouts of the failure event must be considered together with all stakeholders to ensure a proper assessment has been made and that the aircraft will maintain an adequate level of safety. Older practices are sufficient for aircraft with federated systems (e.g., individual system experts utilize layouts they deem sufficient to evaluate failure scenarios usually contained within their system), but they are not sufficient for the current generation of aircraft when it comes to evaluating failures.

A challenge lies in creating these products/records/layouts, which have typically been manually created in various formats by different groups. The challenges are threefold—maintaining consistency among the different products, reducing the resources/time spent in developing the products, and creating alerts for changes.

BRIEF SUMMARY

Example embodiments of the present disclosure are generally directed to a system for integrating failure data for different failure analysis layouts, and corresponding method and computer-readable storage medium. In accordance with example embodiments, failure case layouts may be automatically produced from failure data generated from failure analyses, which may reduce if not eliminate errors/misinterpretations associated with their manual production, and may reduce the engineering time required for their manual production. The failure data may be checked for consistency to thereby integrate the data, which may in turn facilitate consistency between layouts of the data. This may permit better evaluation of the failure case (e.g., determining if a failure case is acceptable or whether a change must be made to ensure overall complex system safety and functionality). The consistency checks of failure data may also ensure production of a safer, more integrated product requiring less time and resources.

According to one aspect of example embodiments, the system includes a data validator and layout engine coupled thereto. The data validator is configured to receive and validate failure analysis data for a complex system including a plurality of systems. The failure analysis data includes failure data identifying one or more failed systems of the plurality of systems, and may also include design data describing the complex system and possible failures of at least some of its systems. In one example, the failed systems may include a failed system directly affected by an originating failure, and any lower-ordered failed systems indirectly affected by the originating failure. And in a more particular example, the systems of the complex system may include one or more electrical systems, with the failed systems including one or more failed electrical systems.

The data validator being configured to validate the failure analysis data may include being configured to perform one or more consistency checks between the failure data and design data to thereby integrate the failure data for a plurality of different failure analysis layouts. The layout engine is in turn configured to selectively generate any one or more of the plurality of different layouts of the failure analysis data, with at least some of the validated failure analysis data being shared between at least some of the different layouts.

In various examples, the failure data may include any of a number of different data. For example, the failure data may include one or more system messages (e.g., alert messages, status messages, maintenance messages) generated in response to respective failures of the failed systems. Additionally or alternatively, for example, the failure data may include hazard levels for respective failures of the failed systems. In another example, the failure data may identify power states of the one or more failed electrical systems. And in yet another example, the failure data may include a list of one or more complex-system-level functions impacted by the failed systems.

In various examples, the design data may include any of a number of different data. For example, the design data may include logical interface information describing logical relationships between the systems of the complex system. Additionally or alternatively, for example, the design data may include a collection of alert messages associated with various systems of the complex system. The design data may include one or more schematic diagrams describing physical relationships between the complex system and its systems, the complex system being dividable into a plurality of physically-distinct zones. Even further, for example, the design data may include a collection of hazard levels associated with various systems of the complex system. In yet another example, the design data may include electrical load data describing the power states of one or more of the electrical systems for various operational states of the complex system. And in an even further example, the design data may include a list of one or more complex-system-level functions and systems of the complex system that implement the respective functions.

In various examples, the data validator may be configured to perform any of a number of different consistency checks, including for example, one or more of a logical-interface consistency check, alert consistency check, location consistency check, logical-interface consistency check, hazard-assessment consistency check, electrical-load consistency check or functional impact consistency check. In one example, the data validator may be configured to perform the logical-interface consistency check including a check that the failed system is logically related to the lower-ordered failed systems, or that the systems logically related to the failed system are the lower-ordered failed systems.

The alert consistency check may include a check that the one or more alert messages generated for the failed systems correlate to alert messages associated with the respective failed systems in the collection of alert messages. The location consistency check may include a check that the failed systems are physically located in the same zone of the complex system. In a further example, the location consistency check may also include a logical-interface consistency check, such as in the manner indicated above.

The hazard-assessment consistency check may include a check that the hazard levels for respective failures of the failed systems correlate to hazard levels associated with the respective failed systems in the collection of hazard levels. The electrical-load consistency check may include a check that the power states of the one or more failed electrical systems correlate to the electrical load data. And in one example, the functional impact consistency check may include a check that the failure data including the complex-system-level functions impacted by the failed systems correlate to the design data including the complex-system-level functions implemented by the respective failed systems.

In other aspects of example embodiments, a method and computer-readable storage medium are provided for creating different, consistent failure analysis layouts for a complex system. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

Figure 1:
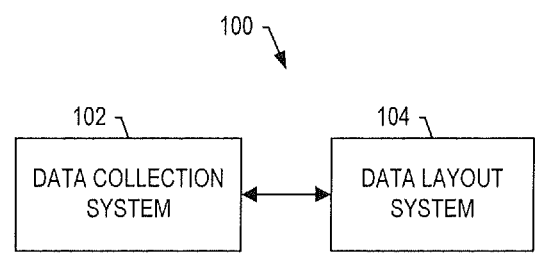
FIG. 1 is an illustration of a failure analysis system in accordance with an example embodiment.

FIGS. 4-8 schematically illustrate various consistency checks that may be performed on failure analysis data according to example embodiments; and FIGS. 9-13 schematically illustrate suitable layout models according to example embodiments.

DETAILED DESCRIPTION

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Also, something may be shown or described as being above something else (unless otherwise indicated) may instead be below, and vice versa; and similarly, something shown or described as being to the left of something else may instead be to the right, and vice versa. Like reference numerals refer to like elements throughout.

Example embodiments of the present disclosure relate generally to the layout of failure analysis data and, in particular, to creating different, consistent failure analysis layouts for a complex system. Example embodiments will be primarily described in conjunction with aerospace applications. It should be understood, however, that example embodiments may be utilized in conjunction with a variety of other applications, both in the aerospace industry and outside of the aerospace industry. In this regard, example embodiments may be utilized on conjunction with complex systems, such as in the case of the aerospace, automotive, marine and electronics. Access to accurate and consistent failure data is important because it can impact multiple aspects of equipment operations, including safety, operations, maintenance, engineering support and the like.

The failure analysis data may relate to one or more failures in a complex system such as an aircraft. A complex system may be generally composed of one or more components, subsystems or the like (each generally referred to as a "subsystem"), with each subsystem being composed of one or more parts, and each part including one or more features. In this regard, the parts of the complex system may be assembled into a number of subsystems, which in turn may be assembled into the complex system. In the context of an aircraft, one or more parts or subsystems may be designed as a modular component of the aircraft often referred to as a line-replaceable unit (LRU), of which a single aircraft may include a number of LRUs and other parts or subsystems. Any of the complex system itself or any of its subsystems, parts (of subsystems), features (of parts) or the like may at times be generally referred to as a "system."

Referring now to FIG. 1, a failure analysis system 100 is illustrated according to example embodiments of the present disclosure. The system may include any of a number of different subsystems (each an individual system) for performing one or more functions or operations with respect to failure analysis data. As shown, for example, the system may include a data collection system 102 and/or data layout system 104. Although shown as part of the failure analysis system, one or more of the data collection system and/or data layout system may instead be separate from but in communication with the failure analysis system. It should also be understood that one or more of the subsystems may function or operate as a separate system without regard to others of the subsystems. And further, it should be understood that the failure analysis system may include one or more additional or alternative subsystems than those shown in FIG. 1.

As described herein, failure analysis data may include failure data and/or design data, and may relate to one or more failures in a complex system. As described herein, a failure may refer to a malfunction, degradation or failure. The failure analysis data may be generally capable of being visualized in an electronic and/or printed (or printable) form; and in this regard, the failure analysis data may include one or more of textual, graphical or other visual content such as still images, video or the like.

For each of one or more failure cases in the complex system, failure data may identify or describe (the terms being synonymous herein, and at times generally referred to as "identify") a system-level failure, and in various instances, one or more effects of the system-level failure. In one example, failure data may be suitable for use in any of a number of different aircraft failure analyses such as particular risk assessment (PRA), threat analyses, zonal safety analysis, system-level failure modes and effects analyses (FMEA), airplane-level FMEA (also known as multi-system FMEA), common cause failure analyses (CCA) or the like.

The effects of a system-level failure may include one or more direct effects, and in various instances, one or more indirect effects, each of which may manifest itself as a failure. In this regard, a direct effect may be any primary (or originating) effect resulting directly from an originating system-level failure. An indirect effect may be any secondary (or second-order) effect, tertiary (or third-order) effect, quaternary (or fourth-order) effect and so on resulting indirectly from an originating system-level failure, and directly from a direct effect or from another indirect effect. In one example, indirect effects may manifest themselves as lower-order failures. For example, an indirect effect may manifest itself as any secondary (or second-order) failure, tertiary (or third-order) failure, quaternary (or fourth-order) failure and so on. An effect may be associated with a combination of failure cases, other effects or combinations of both, only occurring when the combination occurs. For example, a certain direct effect may occur only when two failures occur, or a certain indirect effect may occur only when two direct effects and/or indirect effects occur.

An aircraft, for example, may experience failure of an aircraft electrical bus or navigational system. This failure may in turn lead to direct effects such as hydraulic effects, navigational effects and/or avionics effects, any one or more of which may lead to one or more indirect effects. For example, a hydraulic effect may lead to a flight control effect, which in turn may lead to an air frame vibration effect.

The failure data for a failure case may identify a failure and one or more effects or lower-order failures manifested thereby, and may additionally include one or more alert messages such as crew alert messages, status messages, maintenance messages or the like that may have been generated in response to a failure (originating or lower-order failure). For example, an alert message may be an actionable crew alert message displayed to flight crew to indicate a lack of adequate cabin pressurization. One example of such a crew alert message is an EICAS (engine-indicating and crew-alerting system) message.

The failure data may include one or more compensatory actions (e.g., switch to alternate power, descend aircraft) that may have been taken in response to a failure, such as by the crew or one or more systems of the complex system. The failure data may include an additional effect description, which may relate to one or more additional effects of the respective failure (e.g., loss of lighting, lack of normal landing gear extension, loss of display). The failure data may further include a mapping between each system-level failure and a functional state of a respective system. In one example, functional states may be given by categories, such as by the following in decreasing functionality: "fully functional," "degraded" and "failed."

The failure data may also include a probability and a hazard level for each failure or failed system (failed or lower-ordered failed system), and may further include an overall complex-system-level hazard. In this regard, the probability may indicate the chance of the failure occurring in flight, and the hazard level may indicate the effect of the failure on occupants and/or operations of the complex system. In one example, hazard levels may be numerically represented, such as in order from "one" to "five" in increasing hazard level. In another example, hazard levels may be given by categories, such as by the following in increasing hazard level: "no safety effect," "minor," "major," "hazardous" and "catastrophic."

Even further, the failure data may include a list of one or more complex-system-level functions impacted by each failure. In one example, aircraft-level functions that may be impacted by a failure may include structural integrity, stability and control, operational awareness, environmental control, power generation and distribution, loading, maintenance and ground handling, control on ground or the like.

Also as part of the failure analysis data, design data may include information describing the complex system and possible failures of at least some of its systems. For example, design data may include one or more schematic diagrams of the complex system and/or its systems, which may describe the physical relationships between systems. Additionally or alternatively, for example, design data may include logical interface information, which may describe logical relationships between systems, and which logical relationships may be reflected by logical interfaces between the respective systems. One example of suitable logical interface information is that provided by an interface control document (ICD). Further, for example, the design data may include a list of one or more complex-system-level functions and one or more systems of the complex system that implement the respective functions.

In another example, design data may include electrical load data, which may describe the power state of one or more electrical systems (e.g., powered, not powered, intermittent power) in various operational states of the complex system. In the context of aircraft, in certain operational states (e.g., on ground, power-up, one engine shut down, etc.), an electrical system may be in various power states (e.g., half power, quarter power, etc.). In these situations, certain systems may be powered while other systems may not be powered. The design data may therefore indicate which systems are "load shed" (e.g., power removed from some equipment to maintain basic functionality under certain scenarios). In one example, then, the electrical load data may be given in one or more "load shed" lists.

Design data may also include, for example, a collection of alert messages that may be generated for various associated systems, and/or the logic according to which the respective messages may be set. In one example, alert messages may be prioritized according to an increased need for action, such as "warning," "caution" and "alert." In another example, design data may include a collection of compensatory actions that may be taken in response to a failure, and/or the logic according to which the respective actions may be taken. In yet another example, design data may include a collection of hazard levels that may be given for the complex system and/or various associated systems, and/or sets of failures for which respective hazard levels may be set. In one example, the hazard levels and sets of failures may be given by system safety assessment (SSA) and/or functional hazard assessment (FHA) data.

As explained in greater detail below, the data collection system 102 of the failure analysis system 100 may be generally configured to collect and validate failure data to thereby integrate the failure data for different layouts of failure analysis data, which may include at least some of the failure data and design data. And the data layout system 104 may be generally configured to selectively generate any one or more of a plurality of different layouts of failure analysis data, with at least some of the failure analysis data being shared between at least some of the different layouts. The layout may be visually presented; and in one example, the visual presentation of a layout may be displayable such as in a graphical user interface (GUI) presented by a display. In another example, the visual presentation may be printable such as by a printer configured to generate a printout of the layout. The visual presentation of a layout may at times be generally referred to as simply the layout.

Failure analyses are a common practice in industries focused on complex systems, such as the aerospace industry is for aircraft. Evaluating the overall (e.g., "complex-system-level") hazard classification and acceptability of particular failure cases may involve many stakeholders each requiring their own layout of events. Each stakeholder layout may provide a partial and incomplete explanation of a particular failure case. Example embodiments of the present disclosure may therefore create individual failure layouts and define consistency rules and checks to integrate source failure analysis data underlying the layouts in such a way that a complete evaluation of a failure case may be made.

Figure 2:
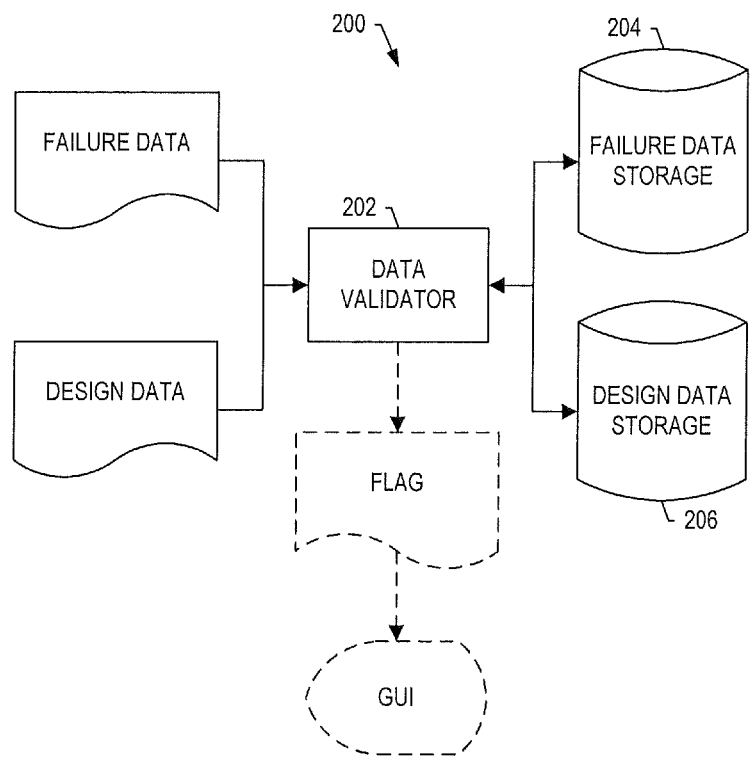
FIG. 2 is an illustration of a data collection system in accordance with an example embodiment.
Figure 3:
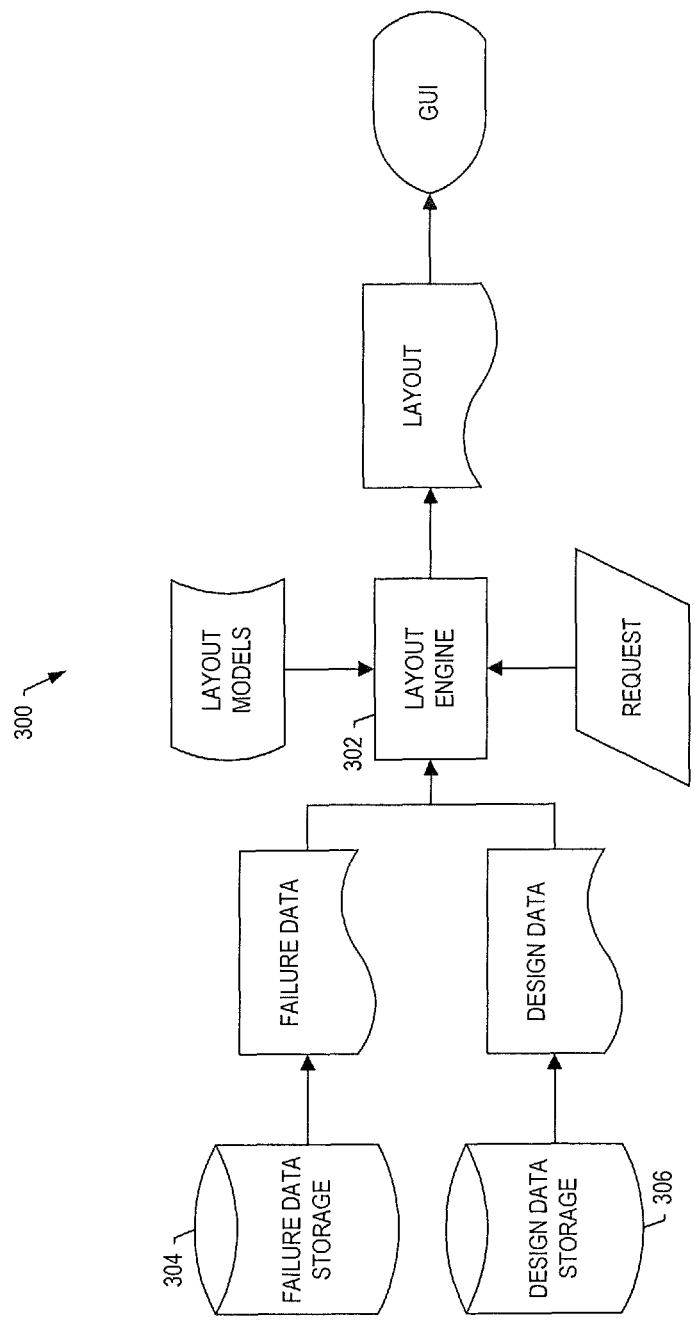
FIG. 3 is an illustration of a data layout system in accordance with an example embodiment.

Reference will now be made to FIGS. 2 and 3, which illustrate more particular examples of a suitable data collection system and data layout system, respectively, according to example embodiments of the present disclosure.

FIG. 2 illustrates a data collection system 200, which in one example embodiment may correspond to data collection system 102. As shown, the data collection system may include a data validator 202 configured to receive failure analysis data including failure data and/or design data. The data validator may be configured to receive the failure analysis data from any of a number of different sources, and which may be formatted in any of a number of different manners. For example, the data validator may be configured to receive failure data for one or more failure cases directly from an operator such as through data entry techniques. In another example, the data validator may be configured to receive failure data directly from a failing complex system, which may be equipped with one or more sensors or embedded systems configured to transmit a signal in the event it or one of its systems experiences a failure. In yet another example, the data validator may be configured to receive failure data from suitable storage such as file storage, database storage, cloud storage or the like.

Similar to failure data, the data validator 202 may be configured to receive design data from any of a number of different sources, and which may be formatted in any of a number of different manners. In one example, the data validator may be configured to receive design data directly from an operator such as through data entry techniques. In another example, the data validator may be configured to receive design data from suitable storage such as file storage, database storage, cloud storage or the like.

As or after the data validator 202 receives failure analysis data, the data validator may be configured to validate at least a portion of the failure analysis data, including performing one or more consistency checks between the failure data and design data. In the event the data validator successfully validates the failure analysis data, the data validator may be configured to communicate the failure data and design data to respective storage 204, 206 for storage and later retrieval. The storage may be resident with the data collection system 200, or may be separate from and in communication with the data collection system. The failure analysis data may be formatted and stored in any of a number of different manners, and hence, their storage may be of any of a number of different types. Examples of suitable types of storage include file storage, database storage, cloud storage or the like.

In the event the data validator 202 fails to successfully validate any portion of the failure analysis data, the data validator may be configured to flag the respective failure analysis data, and may be further configured to communicate an indication of the flag. In one example, the flag indication may be communicated to a GUI in which it may be displayed, or a printer for generating a printout of it. In another example, the flag indication may be communicated to another system, apparatus or the like in accordance with any of a number of different messaging techniques, such as e-mail, instant messaging or the like.

Figure 4:
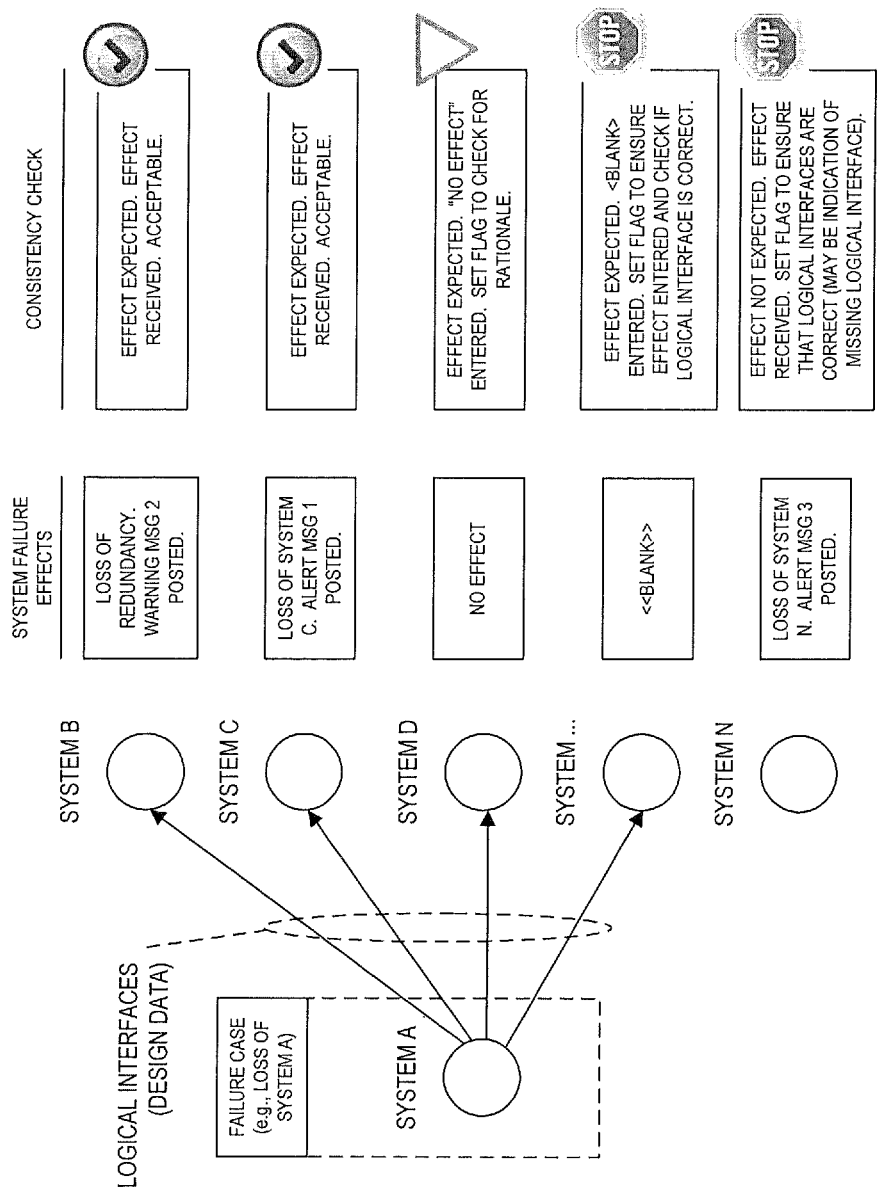

The data validator 202 may be configured to validate or otherwise perform one or more consistency checks on at least a portion of the failure analysis data in any of a number of different manners. In one example, as shown in FIG. 4, the data validator may be configured to perform a logical-interface consistency check using the failure data logical interface information describing logical interfaces between systems of the complex system. Logical interfaces between a system and one or more other systems may indicate systems where effects (e.g., actual effect, reduction in redundancy, "no effect," etc.) should be expected in the event of failure of the respective system. For a failure case identifying a failed (directly affected) system and one or more lower-ordered failed (indirectly affected) systems, then, the data validator may be configured to check that the failed system is logically related to all of the lower-ordered failed systems, and/or that all of the failed system's logically-related systems are lower-ordered failed systems.

Figure 5:
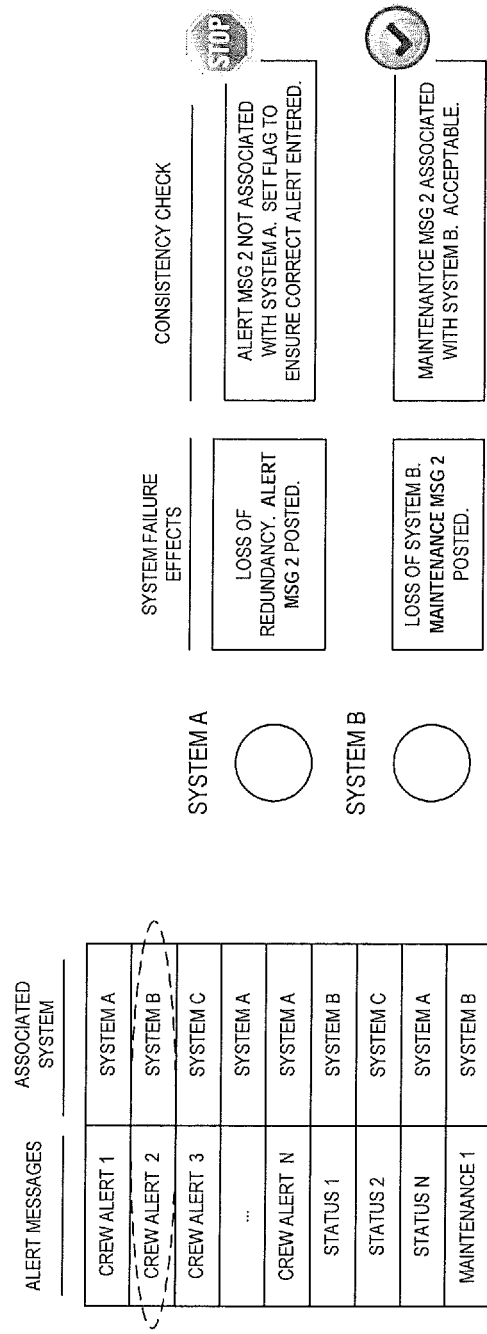

In another example, as shown in FIG. 5, the data validator 202 may be configured to perform a crew-alert consistency check using the failure data and collection of alert messages that may be given for various associated systems of the complex system. In a more particular example, the failure data for a failure case may include one or more alert messages that may be posted or otherwise generated for the failure and/or one or more of its effects, and which may be associated with the failed system and/or one or more lower-ordered failed systems. The design data may similarly include a collection of alert messages that may be given for associated systems of the complex system. The data validator may therefore check that any alert message generated for a failed or lower-ordered failed system correlates to a alert message associated with the respective failed system in the collection of alert messages.

Figure 6:
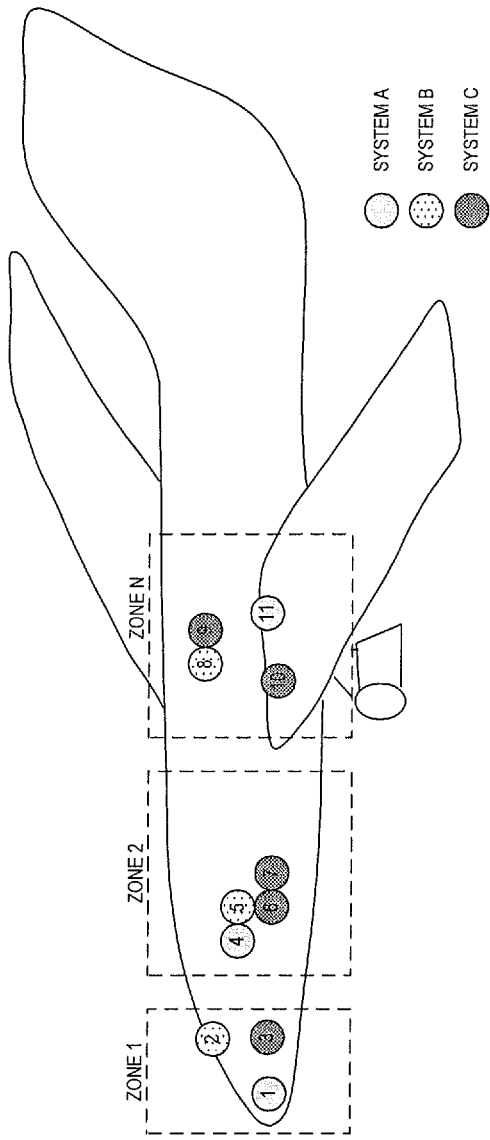

In another example, as shown in FIG. 6 in the context of an aircraft, the data validator 202 may be configured to perform a location consistency check using the failure data, one or more schematic diagrams of the complex system and/or its systems, and/or logical interface information. A system may be linked to its physical location in the complex system, which may be divided into a number of physically-distinct zones. Certain failure analyses such as PRA analyses (e.g., birdstrike analysis, rotorburst analysis, etc.), assume failures to all systems within a particular zone. Systems impacted in the particular zone may in turn have "cascading" effects to its logically-related systems which may be in the same or other zones. The data validator may therefore check that the failed and lower-ordered failed systems in a failure case are physically located in the same zone of the complex system, and may flag any missing or incomplete failure for systems in the respective zone. The data validator may then perform a logical-interface consistency check for logically-related systems in other zones of the complex system, such as in the manner described above with respect to FIG. 4.

Figure 7:
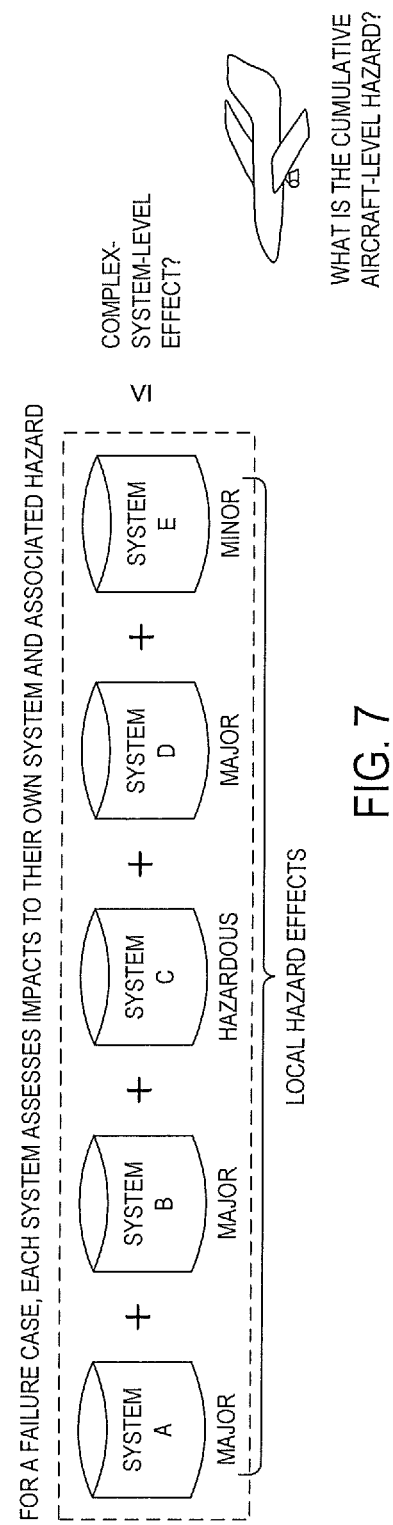

As shown in FIG. 7, the data validator 202 may be configured to perform a hazard-assessment consistency check using the failure data and collection of hazard levels that may be given for the complex system and/or various ones of its systems, which collection may in one example be given by SSA and/or FHA data. Individual systems of the complex system may provide their respective systems' failure data and local hazard effect (effect and hazard associated with their system)—the complex-system-level hazard (e.g., at the aircraft-level) may not be transparent from the system-level effects and associated system-level hazards.

Relative to the hazard-assessment consistency check, a complex-system-level analysis may therefore be performed to determine the overall effect, which may be reflected by a complex-system-level hazard. The data validator 202 may be configured to check that the complex-system-level hazard associated with a failure is not less than an individual system-level hazard (e.g., a complex-system-level hazard rated as "major" while one of its systems rates as "hazardous"). In an instance in which the hazard level of the complex system is less than that of one of its systems, the data validator may flag the failure case. This situation may be remedied in one example by raising the complex-system-level hazard or lowering the higher system-level hazard.

Additionally or alternatively, for example, the hazard-assessment consistency check may include the data validator 202 checking that the local hazard level for a failed or lower-ordered failed system is consistent with the system's hazard level(s) that may be given for the respective system (e.g., from FHA data). That is, the data validator may check that the local hazard level for failed or lower-ordered failed systems correlates to hazard levels associated with the respective systems in the collection of hazard levels. In an instance in which the local hazard level is not consistent, the failure case may be flagged. In one example, this unacceptable condition may be remedied by changing the local hazard for the failure analysis or change the system FHA data.

In a further example, the data validator 202 may be configured to perform an electrical-load consistency check using the failure data and electrical load data, which again may be given in one or more "load shed" lists. In certain failure analyses, electrical systems may be affected, and in these instances, the failure data may identify the power states (e.g., powered or not powered) of these failed electrical systems. Based on the electrical power effect and the associated "load shed" state, systems on the "load shed" list may be "shed" or otherwise failed for purposes of the analysis. This consistency check may ensure that all systems on the load shed list for particular failure cases are represented appropriately in the failure analyses. That is, this consistency check may include a check that the power states of one or more failed electrical systems correlate to the electrical load data. Discrepancies may be flagged for review and correction/disposition.

Figure 8:
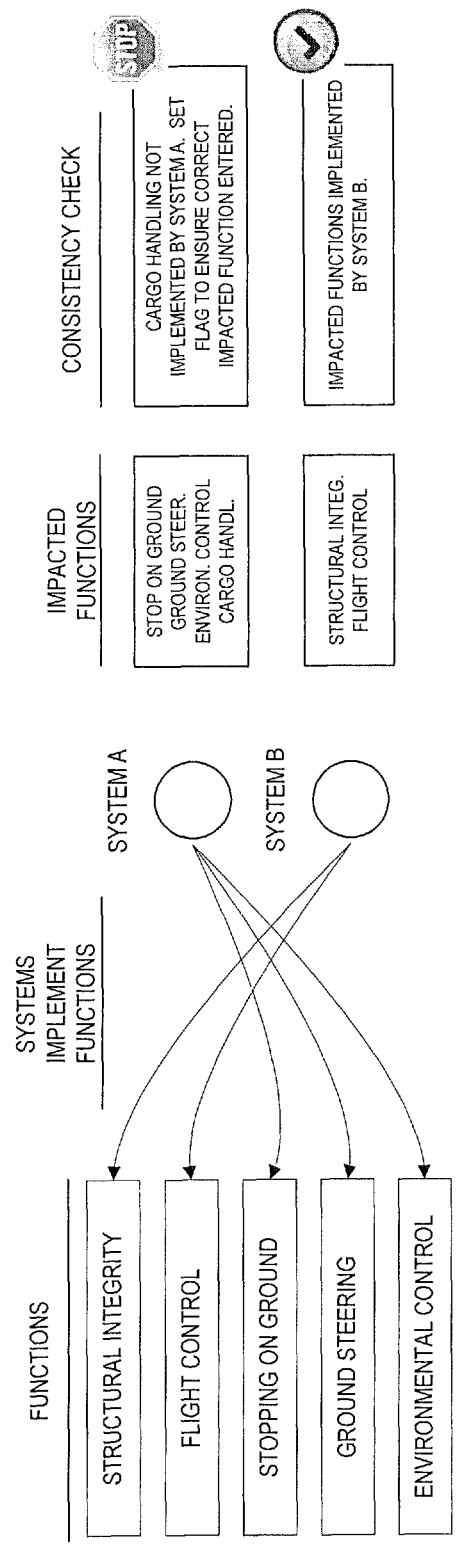

In an even further example, as shown in FIG. 8, the data validator 202 may be configured to perform a functional-impact consistency check using the failure data and design data. In a more particular example, the failure data for a failure case may include a list of one or more complex-system-level functions impacted by the failed or lower-ordered failed systems. The design data may similarly include a list of complex-system-level function(s) and system(s) of the complex system that implement the respective function(s). The data validator may therefore check that the complex-system-level functions impacted by the failed or lower-ordered failed systems correlate to the complex-system-level functions implemented by the respective failed systems.

In various instances, after the failure data and design data are communicated to respective storage 204, 206, either or both may be modified such as by an operator. Modification in these instances may mean any of a number of different changes to the data including, for example, an addition, deletion, revision or the like. In these instances, the data validator 202 may be configured to validate the modified failure or design data and any other data in respective storage that may be impacted by the modified failure or design data.

In one example, a design-data modification may be affected by a change request (CR) or other similar mechanism. A CR may impact one or more systems of the complex system, and it may impact one or more areas including logical interfaces between systems (e.g., new/deleted/revised logical interfaces) and/or alert messages (e.g., new/deleted/revised associations between alerts and systems). Additionally or alternatively, for example, a CR may impact the zonal location of a system such as in the instance system moves between zones. In these and similar events, a CR may include information about the interfaces and system involved in the change (the design side), any one or more of which may be related to failure data of one or more failure cases. The data validator 202 may therefore be configured to identify commonalities between impacted interfaces and/or systems in the change mechanism and relate them to the appropriate failure case(s). If a relationship is found, it may be flagged for evaluation as to whether a change to the failure analysis may be warranted.

Reference is now made to FIG. 3, which illustrates a data layout system 300 according to one example embodiment. As indicated above, the data layout system 300 may be one example of the data layout system 104 of the failure analysis system 100 of FIG. 1. The data layout system may be generally configured to generate a layout of failure analysis data including failure data and/or design data. This data may be or include, for example, data from the data collection system 102, or more particularly in one example, the data collection system 200 of FIG. 2.

As shown in FIG. 3, the data layout system 300 may include a request interface or the like configured to receive a request for failure analysis data. In one example, the request interface may be part of a layout engine 302, layout generator or the like configured to generate a layout of the requested failure analysis data. The failure analysis data may include failure data and/or design data, which may be stored in respective storage 304, 306, which in one example may correspond to respective storage 204, 206 shown in FIG. 2.

The layout engine 302 may be configured to select a layout model from a plurality of layout models for selecting and arranging the requested failure analysis data. The layout engine may be configured to select the layout model in any of a number of different manners. In one example, the layout engine may be configured to select the layout model according to the request for failure analysis data, which may indicate or otherwise reflect a particular layout model. The layout models may include any of a number of different types of layouts for arranging failure analysis data. As indicated above and explained further below, examples of suitable layout models include a cascading effect layout model, flight deck layout model, flight profile layout model, functional impact layout model, test planning layout model or the like. Other examples may include combinations of one or more of the foregoing layout models. The layout models may be maintained in a respective storage such as file storage, database storage, cloud storage or the like, and formatted and stored in any of a number of different manners according to the respective storage.

The layout engine 302 may be configured to retrieve the requested failure analysis data for the selected layout model from respective storage 304, 306. The layout engine may be configured to generate a layout of the retrieved failure analysis data, which may be arranged according to the selected layout model. The layout engine may then be configured to communicate the layout, such as to a GUI in which a layout may be displayed, or a printer for generating a printout of the layout.

The layout generated by the layout engine 302 may be dynamically generated according to a selected layout model such that a different layout of the failure analysis data may be realized by changing the selected layout model. In one example, the layout engine may therefore be further configured to receive a request for a different arrangement of failure analysis data. In this example, the layout engine may be configured to select a different layout model from the plurality of layout models in response to the request. The layout engine may then be configured to generate a different layout of the retrieved failure analysis data. This may include the layout engine being configured to rearrange failure analysis data according to the selected different layout model.

As indicated above, the layout models may include any of a number of different types of layouts for arranging failure analysis data. Reference will now be made to FIGS. 9-13, which schematically illustrate examples of suitable layout models. As shown, these examples include a cascading effect layout, flight deck layout, flight profile layout, functional impact layout, test planning layout or the like.

Figure 9:
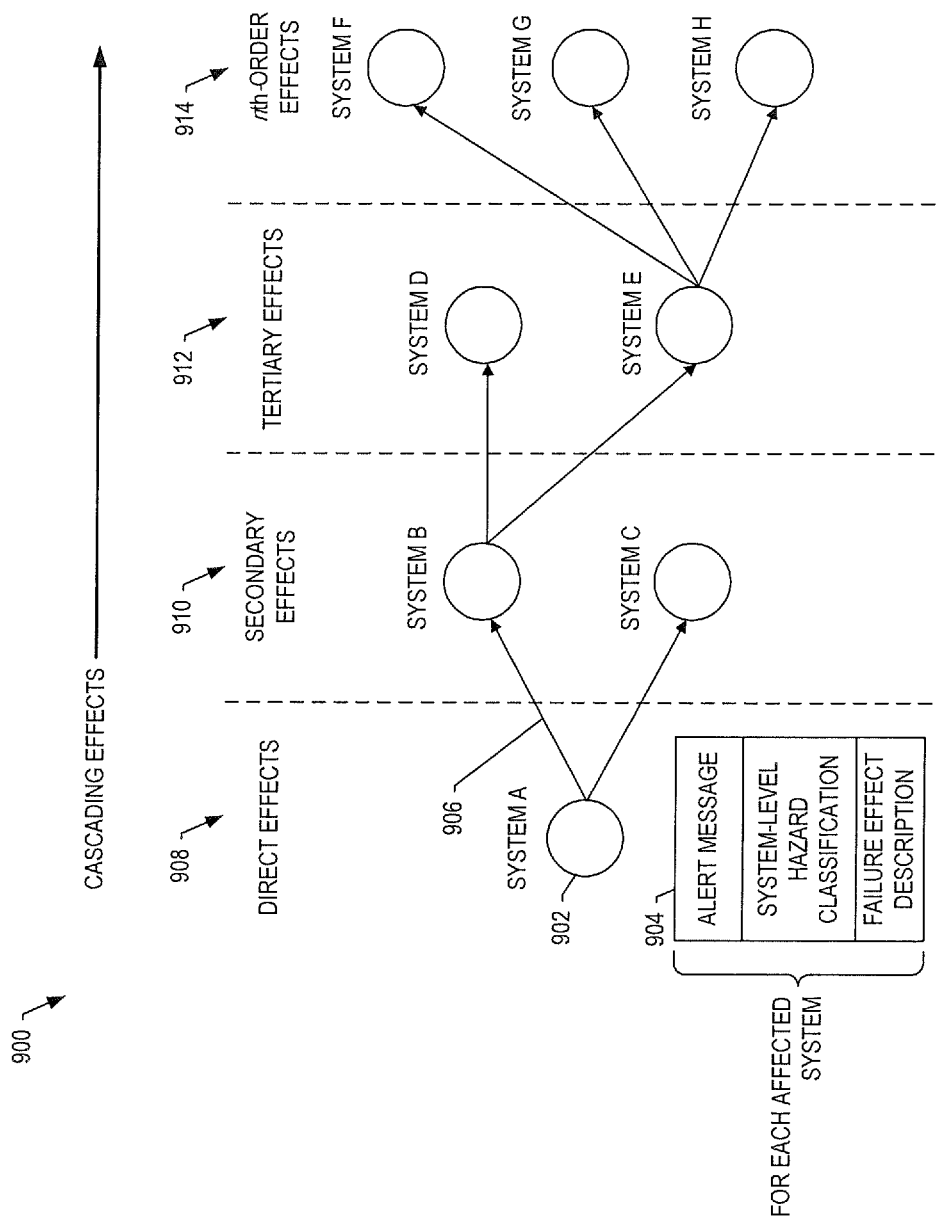

FIG. 9 illustrates a cascading effect layout model 900 according to one example embodiment. The cascading effect layout model generally provides a graphical representation of cascading failure effects including one or more direct effects, and in various instances, one or more indirect effects. As explained above, a direct effect may be any primary (or originating) effect resulting directly from an originating system-level failure. An indirect effect may be any secondary (or second-order) effect, tertiary (or third-order) effect, quaternary (or fourth-order) effect and so on resulting indirectly from an originating system-level failure, and directly from a direct effect or from another indirect effect. This layout model may be of particular interest to understand the reasons behind the effects and the impacts across systems of the complex system. This layout model may be useful to a number of different stakeholders of the complex system such as systems engineers, authorized representatives (ARs), safety engineers, individual system subject matter experts (SMEs), pilots or the like.

As shown in FIG. 9, in the cascading effect layout model 900 for a failure case, each system of the complex system may be represented as a node 902 and include respective failure data 904 such as one or more alert messages (e.g., EICAS messages), system-level hazard level and/or additional effect description (only one node being called out and shown respective failure data FIG. 9). The cascading effect layout model may also illustrate linkages 906 (only one linkage being called out) between the nodes 902, which may illustrate how a failure of one system of the complex system may directly or indirectly result in failure of one or more other systems of the complex system. In one example, these linkages may be presented to illustrate cascading effects of a system failure. In this regard, the cascading effect layout model may identify an originating failed system, and which may experience one or more direct effects of the failure. The originating failed system may in turn be directly or indirectly linked to one or more lower-order failed systems that may experience respective one or more indirect effects. For example, the originating failed system may be directly linked to one or more secondary failed systems that may experience respective one or more secondary effects. The respective secondary failed system(s) may in turn be linked to one or more tertiary failed systems of the complex system that may experience respective one or more tertiary effects. For the complex system, this may occur for n-orders of systems removed from the originating failed system.

In one example, the nodes 902 of the cascading effect layout model 900 may be arranged by the order of their effects. The originating failed system may be organized according to its experiencing the direct effects 908. This originating failed system may then be linked to one or more secondary failed systems organized according to their experiencing the secondary effects 910, and which may be linked to one or more tertiary failed systems organized according to their experiencing the tertiary effects 912. This linkage may then continue to one or more lower-order failed systems organized according to their experiencing the nth-order effects 914. It should be understood that although the cascading effect layout model of FIG. 9 appears to indicate at least two orders of effects resulting from an originating failure, fewer than two orders of effects may result from an originating failure (including an originating failure with only direct effects).

Figure 10:
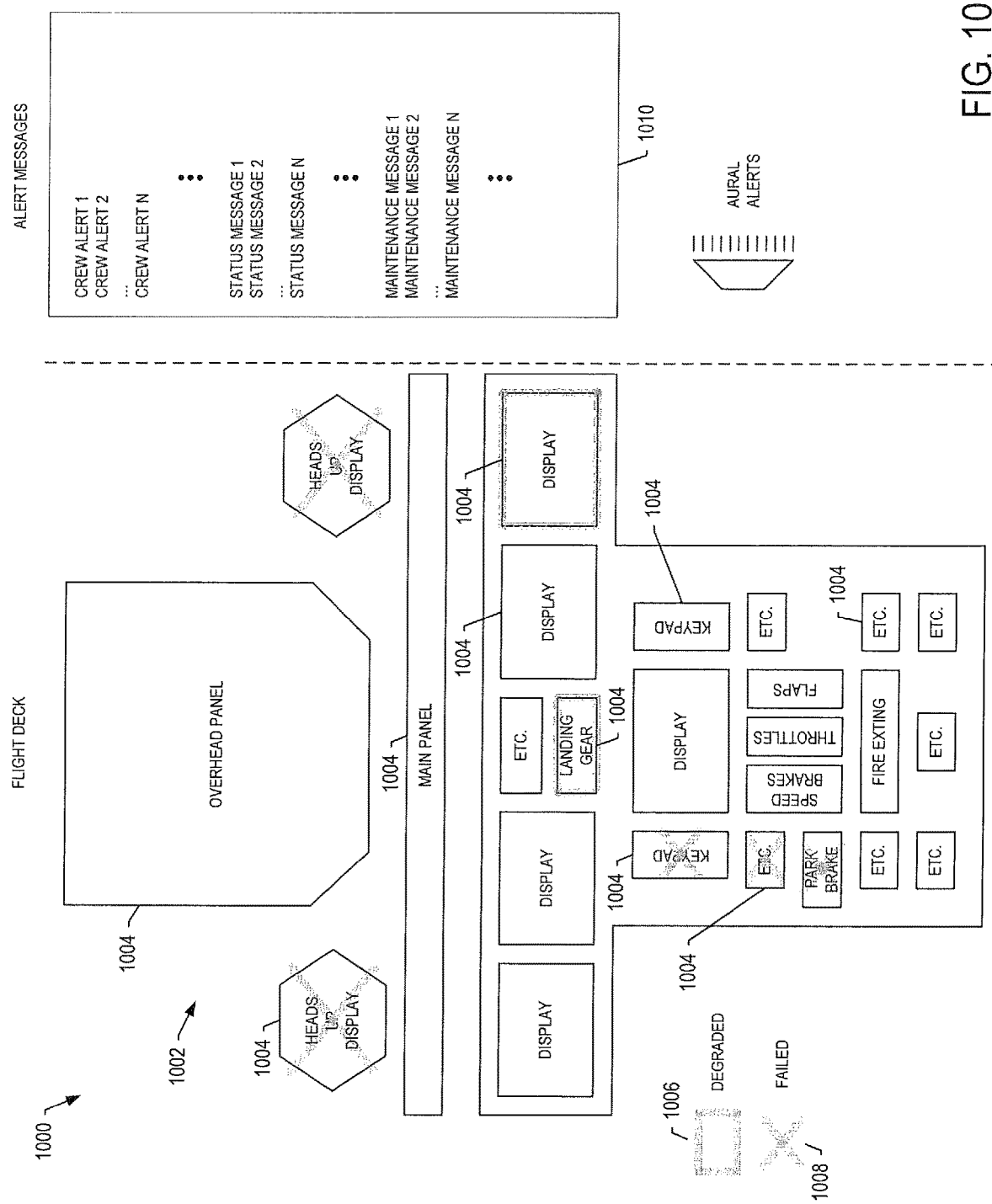

FIG. 10 illustrates a flight deck layout model 1000 according to one example embodiment. The flight deck layout model generally provides a graphical representation of cascading failure effects that may be experienced by one or more flight deck systems. The flight deck layout model may be of particular interest to understand how a particular failure may appear to crew of an aircraft or other similar complex system. This information may be useful to stakeholders such as systems engineers, ARs, safety engineers, system SMEs, pilots and the like.

As shown in FIG. 10, the flight deck layout model 1000 may include a schematic representation of a flight deck 1002 in which various ones of its systems may be illustrated by respective schematic representations 1004 (some but not all of which are called out in FIG. 10). In one example, the flight deck and its systems may be schematically represented in a manner that reflects placement of the systems (or more particularly in one example their controls) that may be visible to crew in the flight deck. In one example, this schematic representation may be generated from design data for the flight deck.

For a failure case, then, the flight deck layout model 1000 may identify one or more failed systems including originating and/or lower-order failed systems, and may do so directly on their respective schematic representations 1004. In one example, the flight deck layout model may textually, graphically or otherwise highlight the schematic representations of one or more failed systems. In a further example, the flight deck layout model may highlight one or more failed systems in a manner that reflects additional failure data such as the functional states of the failed systems. As shown in FIG. 10, for example, the flight deck layout model may outline 1006 representations of failed systems having a "degraded" state, and cross through 1008 representations of failed systems having a "failed" state.

In addition to the foregoing, the flight deck layout model 1000 may include additional failure data for failed systems in the flight deck. In one example, this additional failure data may include for at least some of the failed systems, one or more alert messages 1010 and/or compensatory actions that may have been generated or taken in response to a failure. Additionally or alternatively, for example, the additional failure data may include system-level hazard level and/or additional effect description for at least some of the failed systems.

Figure 11:
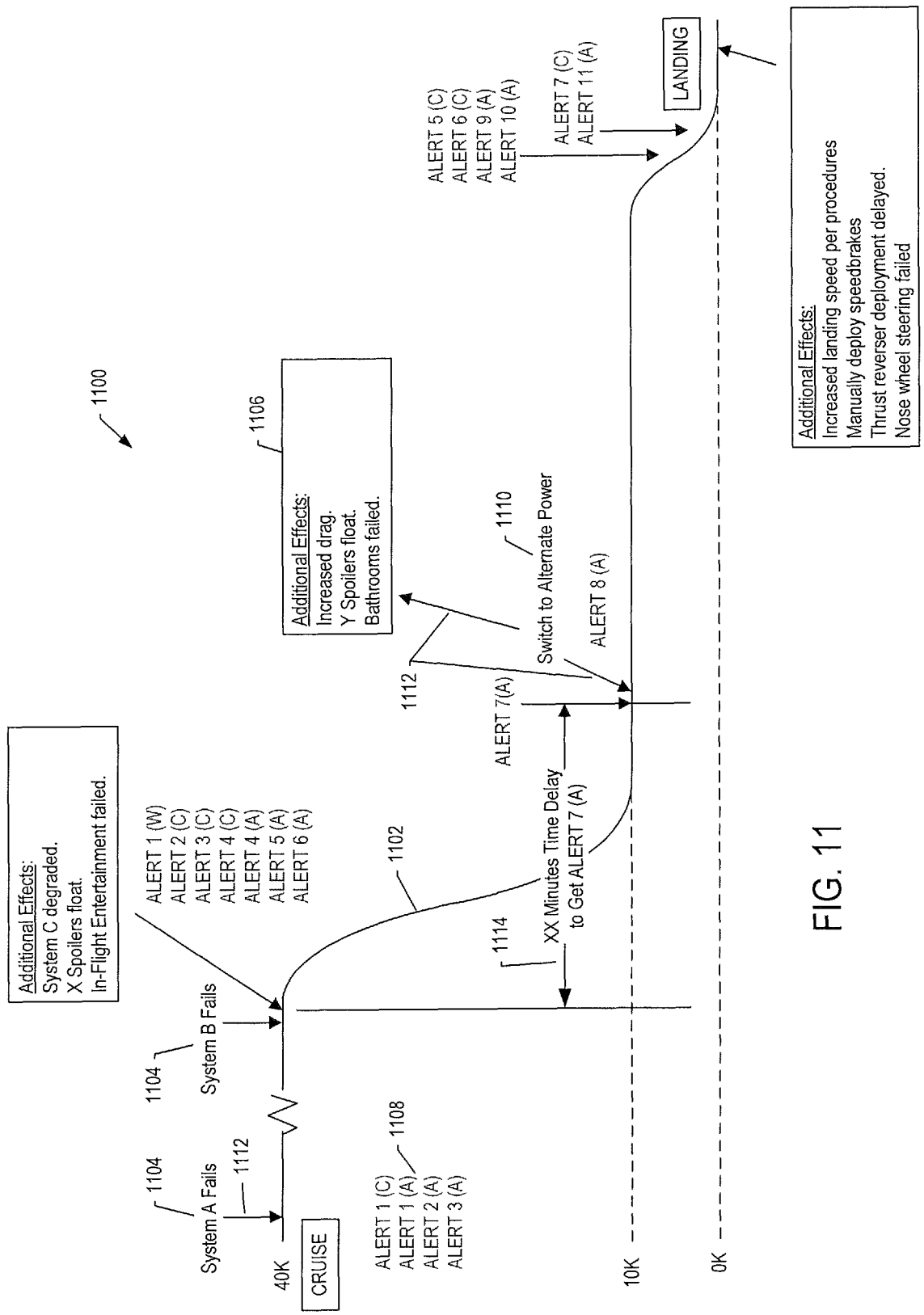

FIG. 11 illustrates a flight profile layout model 1100 according to one example embodiment. The flight profile layout model generally provides a graphical representation of cascading failure effects on a notional flight profile. This layout model may differ from the other "flat" layouts in that it provides a time-phased/flight-phased view of a failure case. Not all system failures occur at the same time. There may be time delays in cascading failures. For example, the loss of cooling may lead to failures in systems that may be degraded or failed above a certain temperature, but it may take time for the system once cooled to increase above the respective temperature. This information may be useful to stakeholders such as systems engineers, ARs, safety engineers, system SMEs, pilots or the like.

As shown in FIG. 11, the flight profile layout model 1100 may include a graphical representation of a flight profile 1102 for a flight of the aircraft, which in one example may appear similar to a line chart of aircraft altitude versus time. The flight profile layout model may then include a timeline of one or more failure cases occurring during the flight, and may do so on the flight profile. In one example, the flight profile layout model may include failure data such as identification of one or more originating or lower-order failures 1104, and/or one or more additional effect descriptions 1106, alert messages 1108 and/or compensatory actions 1110 (some but not all of which are called out in FIG. 11).

At least some of the failure data of the flight profile layout model 1100 may be associated with time (through identified flight phase). The flight profile layout model may therefore include linkages 1112 between failure data and times on the flight profile (shown for one example as an arrowed linkage) (some but not all of the linkages being called out). For example, an originating or lower-order failure 1104 may be associated with the time in which the failure occurred, and additional effects 1106 of a failure may be associated with the time in which those effects are experienced. In another example, a alert message 1108 may be associated with the time in which a system generated the respective message, and a compensatory action 1110 may be associated with the time at which the crew took the respective action. In one example, the flight profile layout model may further indicate a time delay 1114 between a failure and failure data that may be generated or taken in response to the failure.

Figure 12:
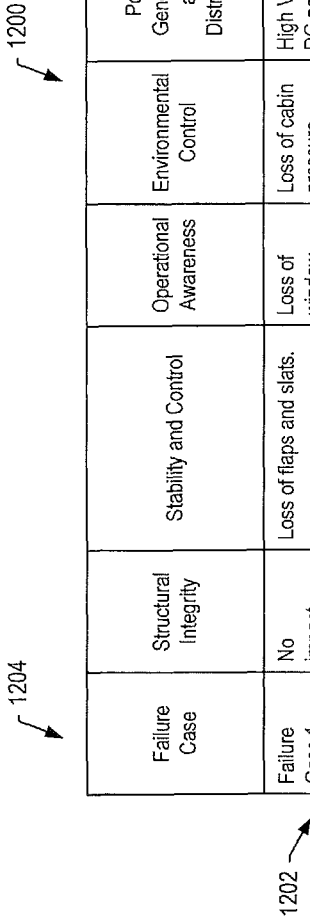

FIG. 12 illustrates a functional impact layout model 1200 according to one example embodiment. The functional impact layout model generally provides a tabular representation summarizing individual system-level effects and their impacts to the complex-system-level functions. This layout model may be unique from the other layout models in that it provides engineers a way to evaluate the overall effect of degradations to each complex-system-level function. This information may be useful to stakeholders such as systems engineers, ARs, safety engineers, system SMEs, pilots or the like.

As shown in FIG. 12, the functional impact layout model 1200 may include a table having one or more rows (or records) 1202 for a respective one or more failure cases, and one or more columns (or fields) 1204 specifying information regarding the respective failure case(s). For each failure case in a row, the columns may identify a failure and/or one or more effects or lower-order failures manifested thereby, and may identify or otherwise summarize complex-system-level functions impacted by the respective failure and/or lower-order failures. In one example, for each failure case, one of the columns may further provide a summary of the combined effect of each complex-system-level function degradation and its effect on the overall complex-system-level safety.

FIG. 13 illustrates a test planning layout model 1300 according to one example embodiment. The test planning layout model generally provides a tabular representation summarizing test plans or procedures for one or more failure cases and failure data associated with the respective failure cases. In this regard, many failure analyses may be performed during complex-system testing by a test team. The test planning layout model of example embodiments may be used to generate test planning layouts directly from failure data, and may include failure data included in others of the layout models. This may facilitate the test team answering any question about a failure should it come up during testing. For example, questions about failure relationships may be seen from failure data in the cascading effects, or questions about when the failures may occur during operation of the complex system may be answered through flight profile layouts.)

As shown in FIG. 13, the test planning layout model 1300 may include a table having one or more rows (or records) 1302 for a respective one or more failure cases to be tested, and one or more columns (or fields) 1304 specifying information regarding the respective failure case(s). As shown, for example, the columns may identify a failure case, and failure data and test procedures for the failure case. For each failure case in a row, the columns may identify a failure and/or one or more effects or lower-order failures manifested thereby, and may identify or otherwise summarize failure data and test procedures for the failure case. In one example, for each failure case, one of the columns may further provide other, miscellaneous information that may be useful to a test team.

According to example embodiments of the present disclosure, the failure analysis system 100 and its subsystems including the data collection system 102 and data layout system 104 may be implemented by various means. Similarly, the examples of a data collection system 200 and data layout system 300, including each of their respective elements, may be implemented by various means according to example embodiments. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary embodiments of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (at times generally referred to as "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for integrating failure data for different failure analysis layouts, the apparatus comprising a processor and a memory storing executable instructions that, in response to execution by the processor, implement at least:

a data validator configured to receive and validate failure analysis data for an aircraft including a plurality of systems, wherein the data validator is configured to receive failure data from a failing aircraft equipped with one or more sensors or embedded systems configured to transmit a signal in the event it or one of its systems experiences a failure, wherein the failure analysis data includes failure data and design data, the failure data identifying a failure of one or more of the plurality of systems that are thereby one or more failed systems, and the design data describing the aircraft and possible failures of at least some of its systems, the design data including one or more schematic diagrams describing physical relationships between the aircraft and its systems, the aircraft being dividable into a plurality of physically-distinct zones, wherein the data validator being configured to validate the failure analysis data includes being configured to perform one or more consistency checks between the failure data and the design data to thereby integrate the failure data for a plurality of different failure analysis layouts, and wherein the data validator is configured to perform, for failure analyses including at least a rotorburst analysis, a location consistency check of the failure of one or more of the plurality of systems within a particular zone that may have a cascading effect related to a number of systems in the same zone, to check if a number of the failed systems are physically located in the same zone; and a layout engine coupled to the data validator and configured to selectively generate at least one of the plurality of different layouts of the failure analysis data including at least a layout according to a flight deck layout model that includes a graphical representation of a flight deck illustrated by schematic representations reflecting system controls that is displayable in a display, the flight deck and system controls being schematically represented in a manner that reflects placement of the system controls visible to crew in the flight deck, the layout graphically identifying one or more failed systems directly on their respective schematic representations reflecting system controls, the one or more failed systems including a failed system directly affected by an originating failure, and/or any lower-ordered failed systems indirectly affected by the originating failure, and the layout textually, graphically or otherwise highlight the respective schematic representations in a manner that reflects additional failure data including functional states of the one or more failed systems.

2. The apparatus of claim 1, wherein the one or more failed systems include the failed system directly affected by the originating failure, and any lower-ordered failed systems indirectly affected by the originating failure, wherein the design data includes logical interface information describing logical relationships between the systems of the aircraft, and wherein the data validator being configured to perform one or more consistency checks includes being configured to perform a logical-interface consistency check using the failure data and the logical interface information, the logical-interface consistency check including a check that the failed system is logically related to the lower-ordered failed systems, or that the systems logically related to the failed system are the lower-ordered failed systems.

3. The apparatus of claim 1, wherein the failure data includes one or more alert messages generated by the aircraft in response to respective failures of the one or more failed systems, and the design data includes a collection of alert messages associated with various systems of the aircraft, and wherein the data validator being configured to perform one or more consistency checks includes being configured to perform an alert consistency check using the generated alert messages and the collection of alert messages, the alert consistency check including a check that the one or more alert messages generated for the one or more failed systems correlate to alert messages associated with the respective failed systems in the collection of alert messages.

4. The apparatus of claim 1, wherein the failure data includes hazard levels for respective failures of the one or more failed systems, and the design data includes a collection of hazard levels associated with various systems of the aircraft, and wherein the data validator being configured to perform one or more consistency checks includes being configured to perform a hazard-assessment consistency check using the hazard levels for respective failures of the one or more failed systems and collection of alert messages, the hazard-assessment consistency check including a check that the hazard levels for respective failures of the one or more failed systems correlate to hazard levels associated with the respective failed systems in the collection of hazard levels.

5. The apparatus of claim 1, wherein the systems of the aircraft include one or more electrical systems, the one or more failed systems include one or more failed electrical systems, and the failure data identifies power states of the one or more failed electrical systems, wherein the design data includes electrical load data describing the power states of one or more of the electrical systems for various operational states of the aircraft, and wherein the data validator being configured to perform one or more consistency checks includes being configured to perform an electrical-load consistency check using the failure data and the electrical load data, the electrical-load consistency check including a check that the power states of the one or more failed electrical systems correlate to the electrical load data.

6. The apparatus of claim 1, wherein the failure data includes a list of one or more aircraft-level functions impacted by the one or more failed systems, wherein the design data includes a list of one or more aircraft-level functions and systems of the aircraft that implement the respective functions, and wherein the data validator being configured to perform one or more consistency checks includes being configured to perform a functional impact consistency check including a check that the failure data including the aircraft-level functions impacted by the one or more failed systems correlate to the design data including the aircraft-level functions implemented by the respective failed systems.

7. A method of integrating failure data for different failure analysis layouts, the method comprising:

receiving failure analysis data for an aircraft including a plurality of systems, wherein the failure data is received from a failing aircraft equipped with one or more sensors or embedded systems configured to transmit a signal in the event it or one of its systems experiences a failure, the failure analysis data including failure data identifying a failure of one or more of the plurality of systems that are thereby one or more failed systems, the failure analysis data further including design data describing the aircraft and possible failures of at least some of its systems, the design data including one or more schematic diagrams describing physical relationships between the aircraft and its systems, the aircraft being dividable into a plurality of physically-distinct zones;

validating the failure analysis data to thereby integrate the failure data for a plurality of different failure analysis layouts, validating the failure analysis data including performing one or more consistency checks between the failure data and the design data;

performing, for failure analyses including at least a rotor-burst analysis, a location consistency check of the failure of one or more of the plurality of systems within a particular zone that may have a cascading effect related to a number of systems in the same zone, to check if a number of the failed systems are physically located in the same zone; and selectively generating at least one of the plurality of different layouts of the failure analysis data including at least a layout according to a flight deck layout model that includes a graphical representation of a flight deck illustrated by schematic representations reflecting system controls that is displayable in a display, the flight deck and system controls being schematically represented in a manner that reflects placement of the system controls visible to crew in the flight deck, the layout graphically identifying one or more failed systems directly on their respective schematic representations reflecting system controls, the one or more failed systems including a failed system directly affected by an originating failure, and/or any lower-ordered failed systems indirectly affected by the originating failure, and the layout textually, graphically or otherwise highlight the respective schematic representations in a manner that reflects additional failure data including functional states of the one or more failed systems.

8. The method of claim 7, wherein the one or more failed systems include the failed system directly affected by the originating failure, and any lower-ordered failed systems indirectly affected by the originating failure, wherein the design data includes logical interface information describing logical relationships between the systems of the aircraft, and wherein performing the one or more consistency checks includes performing a logical-interface consistency check using the failure data and the logical interface information, the logical-interface consistency check including a check that the failed system is logically related to the lower-ordered failed systems, or that the systems logically related to the failed system are the lower-ordered failed systems.

9. The method of claim 7, wherein the failure data includes one or more alert messages generated by the aircraft in response to respective failures of the one or more failed systems, and the design data includes a collection of alert messages associated with various systems of the aircraft, and wherein performing the one or more consistency checks includes performing an alert consistency check using the generated alert messages and the collection of alert messages, the alert consistency check including a check that the one or more alert messages generated for the one or more failed systems correlate to alert messages associated with the respective failed systems in the collection of alert messages.

10. The method of claim 7, wherein the failure data includes hazard levels for respective failures of the one or more failed systems, and the design data includes a collection of hazard levels associated with various systems of the aircraft, and wherein performing the one or more consistency checks includes performing a hazard-assessment consistency check using the hazard levels for respective failures of the one or more failed systems and collection of alert messages, the hazard-assessment consistency check including a check that the hazard levels for respective failures of the one or more failed systems correlate to hazard levels associated with the respective failed systems in the collection of hazard levels.

11. The method of claim 7, wherein the systems of the aircraft include one or more electrical systems, the one or more failed systems include one or more failed electrical systems, and the failure data identifies power states of the one or more failed electrical systems, wherein the design data includes electrical load data describing the power states of one or more of the electrical systems for various operational states of the aircraft, and wherein performing the one or more consistency checks includes performing an electrical-load consistency check using the failure data and the electrical load data, the electrical-load consistency check including a check that the power states of the one or more failed electrical systems correlate to the electrical load data.

12. The method of claim 7, wherein the failure data includes a list of one or more aircraft-level functions impacted by the one or more failed systems,
wherein the design data includes a list of one or more aircraft-level functions and systems of the aircraft that implement the respective functions, and
wherein performing the one or more consistency checks includes performing a functional impact consistency check including a check that the failure data including the aircraft-level functions impacted by the one or more failed systems correlate to the design data including the aircraft-level functions implemented by the respective failed systems.

13. A computer-readable storage medium that is non-transitory and has computer-readable program code portions stored therein that, in response to execution by a processor, cause an apparatus to at least:
receive and validate failure analysis data for an aircraft including a plurality of systems, wherein the failure data is received from a failing aircraft equipped with one or more sensors or embedded systems configured to transmit a signal in the event it or one of its systems experiences a failure,
wherein the failure analysis data includes failure data and design data, the failure data identifying a failure of one or more of the plurality of systems that are thereby one or more failed systems, and the design data describing the aircraft and possible failures of at least some of its systems, the design data including one or more schematic diagrams describing physical relationships between the aircraft and its systems, the aircraft being dividable into a plurality of physically-distinct zones,
wherein the apparatus being caused to validate the failure analysis data includes being caused to perform one or more consistency checks between the failure data and the design data to thereby integrate the failure data for a plurality of different failure analysis layouts, and
wherein the apparatus is caused to perform, for failure analyses including at least a rotorburst analysis, a location consistency check of the failure of one or more of the plurality of systems within a particular zone that may have a cascading effect related to a number of systems in the same zone, to check if a number of the failed systems are physically located in the same zone; and
selectively generate at least one of the plurality of different layouts of the failure analysis data including at least a layout according to a flight deck layout model that includes a graphical representation of a flight deck illustrated by schematic representations reflecting system controls that is displayable in a display, the flight deck and system controls being schematically represented in a manner that reflects placement of the system controls visible to crew in the flight deck, the layout graphically identifying one or more failed systems directly on their respective schematic representations reflecting system controls, the one or more failed systems including a failed system directly affected by an originating failure, and/or any lower-ordered failed systems indirectly affected by the originating failure, and the layout textually, graphically or otherwise highlight the respective schematic representations in a manner that reflects additional failure data including functional states of the one or more failed systems.

14. The computer-readable storage medium of claim 13, wherein the one or more failed systems include the failed system directly affected by the originating failure, and any lower-ordered failed systems indirectly affected by the originating failure,
wherein the design data includes logical interface information describing logical relationships between the systems of the aircraft, and
wherein the apparatus being caused to perform one or more consistency checks includes being caused to perform a logical-interface consistency check using the failure data and the logical interface information, the logical-interface consistency check including a check that the failed system is logically related to the lower-ordered failed systems, or that the systems logically related to the failed system are the lower-ordered failed systems.

15. The computer-readable storage medium of claim 13, wherein the failure data includes one or more alert messages generated by the aircraft in response to respective failures of the one or more failed systems, and the design data includes a collection of alert messages associated with various systems of the aircraft, and
wherein the apparatus being caused to perform one or more consistency checks includes being caused to perform an alert consistency check using the generated alert messages and the collection of alert messages, the alert consistency check including a check that the one or more alert messages generated for the one or more failed systems correlate to alert messages associated with the respective failed systems in the collection of alert messages.

16. The computer-readable storage medium of claim 13, wherein the failure data includes hazard levels for respective failures of the one or more failed systems, and the design data includes a collection of hazard levels associated with various systems of the aircraft, and
wherein the apparatus being caused to perform one or more consistency checks includes being caused to perform a hazard-assessment consistency check using the hazard levels for respective failures of the one or more failed systems and collection of alert messages, the hazard-assessment consistency check including a check that the hazard levels for respective failures of the one or more failed systems correlate to hazard levels associated with the respective failed systems in the collection of hazard levels.

17. The computer-readable storage medium of claim 13, wherein the systems of the aircraft include one or more electrical systems, the one or more failed systems include one or more failed electrical systems, and the failure data identifies power states of the one or more failed electrical systems,
wherein the design data includes electrical load data describing the power states of one or more of the electrical systems for various operational states of the aircraft, and
wherein the apparatus being caused to perform one or more consistency checks includes being caused to perform an electrical-load consistency check using the failure data and the electrical load data, the electrical-load consistency check including a check that the power states of the one or more failed electrical systems correlate to the electrical load data.

18. The computer-readable storage medium of claim 13, wherein the failure data includes a list of one or more aircraft-level functions impacted by the one or more failed systems,
- wherein the design data includes a list of one or more aircraft-level functions and systems of the aircraft that implement the respective functions, and
- wherein the apparatus being caused to perform one or more consistency checks includes being caused to perform a functional impact consistency check including a check that the failure data including the aircraft-level functions impacted by the one or more failed systems correlate to the design data including the aircraft-level functions implemented by the respective failed systems.

19. The apparatus of claim 3, wherein the aircraft includes one or more sensors or embedded systems configured to generate one or more alert messages in response to the respective failures of the one or more failed systems, the one or more alert messages including one or more crew alert messages displayed to flight crew, and the failure data further including one or more compensatory actions in response to the respective failures of the one or more failed systems.

20. The method of claim 9 further comprising one or more sensors or embedded systems of the aircraft generating one or more alert messages in response to the respective failures of the one or more failed systems, the one or more alert messages including one or more crew alert messages displayed to flight crew, and the failure data further including one or more compensatory actions in response to the respective failures of the one or more failed systems.

21. The apparatus of claim 1, wherein the additional failure data includes for at least some of the one or more failed systems, one or more alert messages and/or compensatory actions generated or taken in response to failure of the at least some of the one or more failed systems.

22. The apparatus of claim 1, wherein the flight deck layout model provides a graphical representation of cascading failure effects experienced by one or more flight deck systems to reflect how a particular failure appears to the crew.

* * * * *